(12) United States Patent
Geng

(10) Patent No.: US 6,600,168 B1
(45) Date of Patent: Jul. 29, 2003

(54) HIGH SPEED LASER THREE-DIMENSIONAL IMAGER

(75) Inventor: Zheng J. Geng, Rockville, MD (US)

(73) Assignee: Genex Technologies, Inc., Kensington, MD (US)

(*) Notice: Subject to any disclaimer, the term of this patent is extended or adjusted under 35 U.S.C. 154(b) by 71 days.

(21) Appl. No.: 09/777,027

(22) Filed: Feb. 5, 2001

Related U.S. Application Data (60) Provisional application No. 60/180,045, filed on Feb. 3, 2000.

(51) Int. Cl.[7] .................................................. G06K 9/62

(52) U.S. Cl. .......................... 250/559.22; 250/559.19; 250/559.23

(58) Field of Search ............... 250/559.29, 559.31, 250/208.1, 206.1, 3.05, 559.32, 559.38, 559.39, 559.22, 559.19, 234, 235, 236, 559.23; 356/3.01, 3.02, 3.03, 3.1

(56) References Cited

U.S. PATENT DOCUMENTS

| | | | | |
|---|---|---|---|---|
| 4,443,705 A | * | 4/1984 | DiMatteo et al. ............ | 250/558 |
| 4,687,325 A | * | 8/1987 | Corby, Jr. .................... | 356/3.09 |
| 5,615,003 A | * | 3/1997 | Hermary et al. ............. | 356/3.03 |
| 5,912,739 A | * | 6/1999 | Fowler et al. ............ | 250/559.22 |
| 5,995,650 A | * | 11/1999 | Migdal et al. ............... | 382/154 |
| 6,441,888 B1 | * | 8/2002 | Azuma et al. .............. | 356/4.01 |

* cited by examiner

*Primary Examiner*—Robert H. Kim
*Assistant Examiner*—Hoon K. Song
(74) *Attorney, Agent, or Firm*—Steven L. Nichols; Paul W. Fish; Rader, Fishman & Grauer PLLC (57) ABSTRACT

A high-speed three-dimensional imaging system and method projects a spatially varying intensity pattern onto an object or scene to be imaged using a laser light source in conjunction with a scanner. The pattern varies in intensity with respect to the projection angle. A pixel intensity ratio is calculated based on the intensity information of an image pair that is illuminated by two different patterns, thereby establishing a one-to-one correspondence between pixel intensity ratio and the projection angle.

20 Claims, 4 Drawing Sheets

HIGH SPEED LASER THREE-DIMENSIONAL IMAGER

REFERENCE TO RELATED APPLICATIONS

This application claims the benefit of U.S. Provisional Appln. No. 60/180,045, filed Feb. 3, 2000, the disclosure of which is incorporated by reference in its entirety.

TECHNICAL FIELD

The present invention relates to high-speed imaging, and more particularly to a high-speed three-dimensional imaging system and method that captures digital images in real time.

BACKGROUND OF THE INVENTION

High-speed three-dimensional (3D) imaging is an increasingly important function in advanced sensors in both military and civilian applications. For example, high-speed 3D capabilities offer many military systems with greatly increased capabilities in target detection, identification, classification, tracking, and kill determination. As a further example, real time 3D imaging techniques also have great potential in commercial applications, ranging from 3D television, virtual reality, 3D modeling and simulation, Internet applications, industrial inspection, vehicle navigation, robotics and teleoperation, to medical imaging, dental measurement, apparel and footwear industries.

In conventionally known 3D imaging systems and techniques, however, the system can only measure a single point or single line on the surface of object or objects being imaged. These systems cannot be used for real-time full frame 3D imaging applications because they often employ a scanning laser beam or laser sheet and an image sensor (e.g., a CCD) to record the locations of the surface points illuminated by the laser. The 3D coordinates on the single spot or multiple points along the line illuminated by the laser can be obtained using a simple triangulation.

To obtain a full-frame 3D image using traditional scanning laser methods, a spot-by-spot or line-by-line scanning process is required, which tends to be inefficient and time-consuming. This type of 3D imaging also has the potential of introducing large measurement errors when the objects to be measured are moving during the scanning process. These systems are therefore unsuitable for high-speed 3D imaging applications because they cannot provide full-frame 3D images in real time at a video rate (e.g., at least 30 frames per second).

There is a need for a high-speed 3D imaging system that can obtain full-frame 3D images in real time. More specifically, there is a need for a system that can obtain the value of each picture element (i.e., pixel) in a captured digital image that represents the physical distance between the focal point of the imager and the corresponding surface point on objects in a scene, thereby allowing calculation of the (x,y,z) coordinates of all of the surface points viewed by the imager based on the 3D image data and the optical parameters of the imager's geometry.

SUMMARY OF THE INVENTION

Accordingly, the present invention is directed to a system and method for high-speed generation of three-dimensional images of a scene. The system includes a light source, such as a laser, that projects a spatially varying intensity light pattern onto the scene to illuminate the scene. A camera captures images of the illuminated scene, and a processor calculates distances to points in the scene corresponding to pixel in an image from the camera by matching intensities with projection angles.

In one embodiment, the scene is illuminated with an even pattern and an odd pattern, each of which have different intensity distributions across the scene. The camera then captures an even image field and an odd image field corresponding with the even pattern and odd pattern, respectively, such that the even and odd image fields together form one complete image frame.

Illuminating a scene to be imaged with a spatially varying intensity light pattern allows the inventive system to capture full-frame 3D images in a single snapshot. Further, because the inventive system can capture images at a high speed, the system can capture successive images in real time, if desired.

DETAILED DESCRIPTION OF THE PREFERRED EMBODIMENTS

Figure 1:
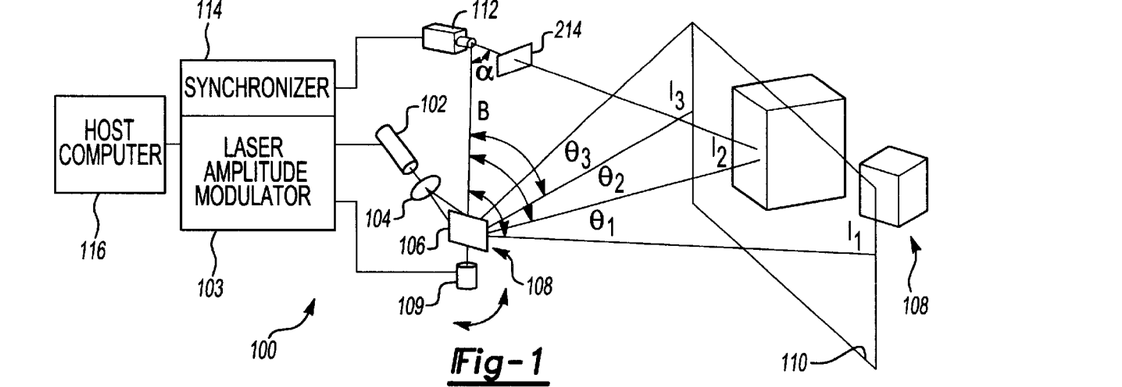
FIG. 1 is a representative diagram of a 3D imaging system according to one embodiment of the present invention.

FIG. 1 illustrates a high-speed 3D imaging system 100 according to the present invention. The general operation of the imaging system 100 is as follows. A laser light source 102 produces a time-variant (i.e., intensity modulated) beam that is modulated by a laser amplitude modulator 103 and that passes through a cylindrical lens 104 to form a sheet of light 106. The light sheet 106 impinges on a scanning mirror 108 of a scanner 109, which reflects the light sheet 106 towards 3D objects in a scene 108 to form a light pattern 110. As the scanning mirror 108 rotates, the resultant light pattern 110 can be projected over the entire field of view of a camera 112, such as a CCD camera, in the system 100. The camera 112, which is spaced apart from the scanner 109 along a baseline B, captures paired images of the scene 108 under alternating even and odd illumination patterns, which will be explained in greater detail below. The timing of image acquisition, laser magnitude modulation, and the angular position of the scanning mirror 108 is controlled by a synchronizer 114 so that the light pattern 110 is a spatially varying intensity projection and that images of the scene 108 are captured by the even and odd fields in the images.

Captured image pairs from the camera 112 are sent to a host computer 116 to perform pixel-wise intensity normalization to find the pixel intensity ratio R for all the pixels in the image pair. Using a one-to-one corresponding relationship between the intensity ratio R and projection angle θ, which will be explained in greater detail below, the projection angle associated with each pixel (thus each surface point) can be uniquely determined. The value of viewing angle α is determined by the geometrical parameters of the camera 112 and by the coordinates of each pixel on the camera image plane. The angle values α and θ, together with the known baseline length B, provide all the necessary information to determine a full-frame 3D image and the corresponding coordinate values (x, y, z) of any spot on the surface of objects in the scene 108 visible by the camera 112.

With respect to specific components that can be incorporated into the system 100, the laser light source 102 is preferably is a narrow-band light source, such as a laser line projector, that can generate projected light stripes onto the surfaces of objects in the scene 108. The modulation frequency for the laser light source 102 intensity can be within a range of hundreds to thousands of hertz, which is easily attainable for most laser modules. A solid-state diode laser with line projection optics are a preferred choice for use in the inventive system due to their ease of use and maintenance. The laser line projector preferably also produces a non-Gaussian, evenly illuminated line of laser light such that the laser beam does not have any light intensity variations or fading toward the ends of the beam.

Figures 2A, 2B, 2C:
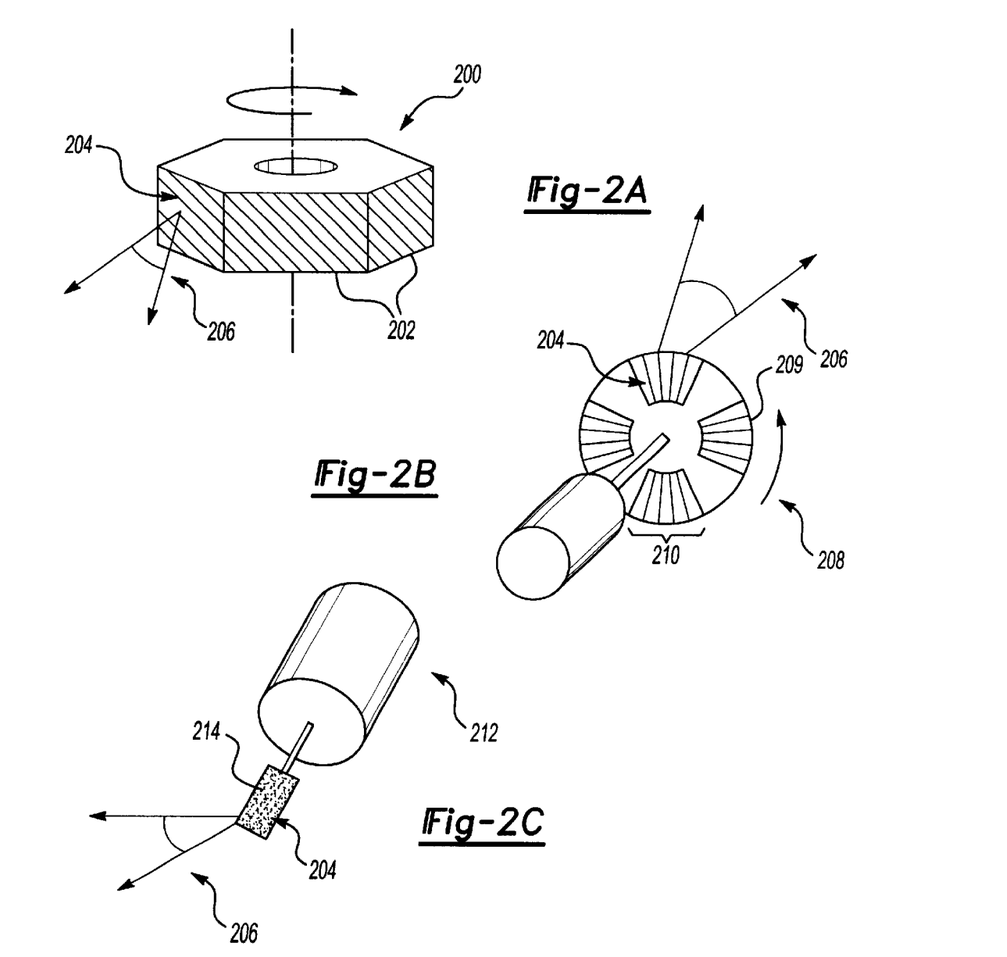
FIGS. 2A, 2B and 2C illustrate examples of scanners that can be used in embodiments of the inventive system.

The laser beam scanner 108 can be selected among several options, and the optimal choice for a given 3D imaging application will depend on the relative importance of factors such as cost, speed, resolution and efficiency for that application. As shown in FIGS. 2A through 2C, several types of scanners are suitable for use in the inventive system, including but not limited to rotating polygon scanners (FIG. 2A), holographic disk scanners (FIG. 2B), and galvanometric scanners (FIG. 2C). These scanners are currently known and available and have been used in applications such as supermarket bar-code scanners, laser printers, and television projection systems. Other, less.commonly available electro-optic scanners (not shown) scanners may also be used because they exhibit fast switching times and high performance and have been used for such applications as streak cameras and video display systems.

Rotating polygon scanners 200, such as the one shown in FIG. 2A, are considered the basic standard by which other scanners are often compared. The rotating polygon scanner is a mechanical reflective scanner that includes a plurality of rotating mirror facets 202 that reflect a laser light beam 204. The mirror facets 202 in the scanner spin at a high rotational speed, with the scan angle 206 and scan rate being directly related to the rotational speed and the number of mirror 202 of the polygonal scanner 200.

Note that polygon scanners 200 offer only raster-based scanning, which is useful for applications requiring repetitive, unidirectional scanning (e.g., film recorders and television displays). Also, the scanning rate for polygon scanners 200 is essentially equivalent to the scanner resolution since every point is addressed during each scan. Polygon scanners 200 are relatively inexpensive, but offer limited or no flexibility in the adjustment of the scanning angle 206 to accommodate different fields of view if this feature is desired.

Referring now to FIG. 2B, a holographic (or grating) scanner 208 may also be used as the laser beam scanner 109 in the inventive system. Holographic scanners 208 typically include a rotating disk 209 containing a spatially varying holographic pattern or a large number of segmented holographic elements 210 which can deflect an incident laser beam 204 over a predetermined number of scan paths at selected scan angles 206. The holographic scanner 208 uses the same general mechanical-diffraction technology and has the same inherent scanning capacity (number of resolution spots) as the polygon mirror scanner 200 described above on the order of 10,000 points. As such, the holographic scanner 208 is strictly a raster-based scanner capable of only cyclically retracing a prescribed optical path. The holographic scanner 208 does have an advantage over the polygon scanner 200, however, because the holographic scanner 208 is able to scan an optical path in a complex fashion because the scan angle 206 and speed can be controlled by the design of the holographic segments 210.

Another type of scanner that can be used in the inventive system is a moving coil galvanometric scanner 212, as represented in FIG. 2C. The galvanometric scanner 212 uses a small, single surface mirror 214 that is electro-mechanically vibrated. This configuration allows two scanners to be operated in tandem to conduct X-Y scanning, if desired.

Galvanometric scanners 212 can be classified into resonant scanners and broadband scanners, which differ primarily in terms of the suspension damping mechanism (not shown) used by the scanner. Resonant mode devices exploit the large mechanical resonance of high inertia, high Q-factor designs which are only capable of steady-state single frequency operation. Because of their higher operating frequency and larger scanning angles (i.e., greater than 20 degrees), resonant mode devices have the advantages of very high resolution (>10,000 pts.), high scan speeds and high accuracy. However, such devices are restricted solely to raster scanning operations. Broadband device designs rely on smaller, low inertia mirrors that can be operated at variable scan rates and are designed for random access addressing rather than strictly raster scanning operations. Broadband devices are slower than the resonant types, having random access times on the order of 1 msec (depending on mirror size and full scan angle) and resolutions of up to 2000 points. Regardless of the specific galvanometer scanner class, this type of scanner 212 is preferred in the inventive system due to its excellent linearity and controllability.

The camera 112 used in the inventive system can be a monochromic CCD camera; the system does not require a camera with color capabilities. Although a color CCD camera can be used in the inventive system, a monochromic CCD camera is preferred because of its lower cost and higher signal-to-noise ratio. Preferably, the CCD camera used in the present invention has a ⅓ inch CCD chip (not shown) and should provide both non-interlaced (progressive scan at a rate of, for example, 30 frames per second) and interlaced modes (alternative even and odd field scan at a rate of, for example, 60 fields per second) of operation. An image grabber board in the camera 112 can be used to transfer a continuous sequence of full frame of images into the host computer's 116 memory in real-time. The image resolution is preferably software selectable, for example a standard NTSC image format of 640×480 pixels can be selected.

Note that the inventive system 100 may also include an optional narrow-band interference filter 214 placed in front of the camera 112, as shown in FIG. 2, to eliminate background noise and increase the signal-to-noise ratio (the magnitude ratio of the detected active projection signal to background noise in a given frame) of acquired images under strong ambient light. Without the filter 214, the ambient light may tend to dominate the captured image signal and make it difficult to determine the intensity variations in the image, particularly if the ambient light is strong.

Figure 3A:
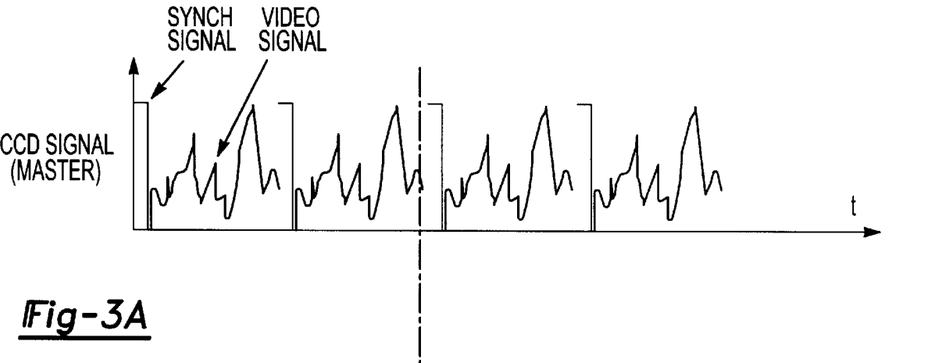
FIGS. 3A, 3B and 3C are timing diagrams illustrating the timing relationship between a camera signal, a scanning angle, and laser intensity.
Figure 3B:
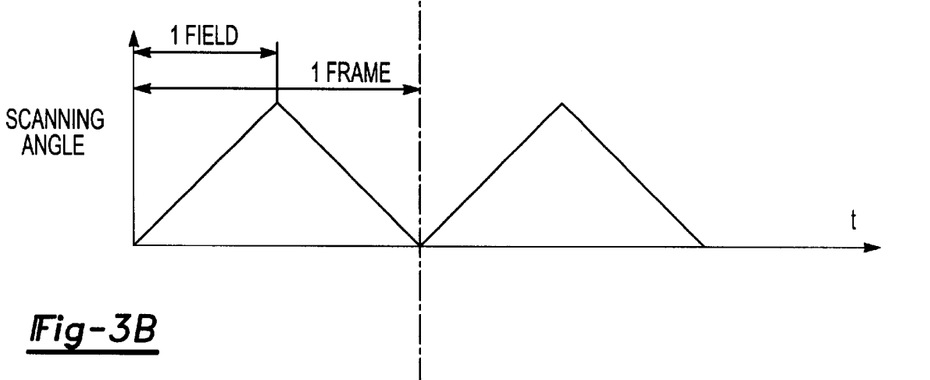
Figure 3C:
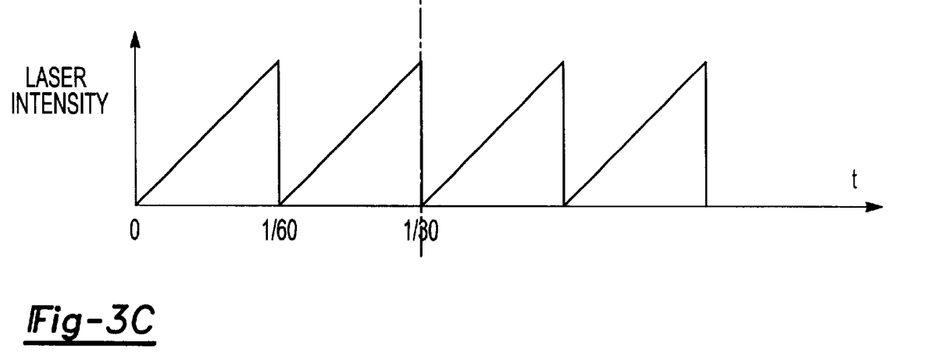

Referring now to FIGS. 3A through 3C, the synchronizer 114 in the inventive system 100 coordinates the timing of the laser amplitude modulator 103 intensity variation, the scanner 109 operation, and the camera 112 frame acquisition. As can be seen in the Figures, a sync signal from the CCD camera 112 acts as a master timing trigger to control the scanning angle of the scanner 109 and the intensity of the laser amplitude modulator 103. As the scanner 109 moves back and forth along its scanning angle range, as shown in FIG. 3B, the intensity of laser line projection varies to form two alternatively varying illumination patterns onto the objects, as shown in FIG. 3C.

The operation of the camera 112, laser scanner 109, laser light source 102 and synchronization module 114 in the system 100 are all controlled by a host computer 116 that preferably has a high speed I/O module (e.g., a National Instrument PCI MIO-16E4 plug-in board). The I/O module preferably has a built-in function generator to produce the sawtooth signal for controlling the scanner 109 and laser modulator 103. The host computer 116 may also include another plug-in board to act as the image frame grabber. Using this system, the speed for image capturing by the host computer will be a standard video rate (e.g., 30 frames per second), with the image processing speed and 3D algorithm is about 1.5 second per frame (using a Pentium 300 MHz computer). Of course, system performance can be further improved by optimizing the real-time processing algorithms and also by adopting higher-speed computation engines.

The specific manner in which the inventive system 100 conducts 3D imaging will now be explained. As noted above, the inventive system 100 is able to acquire full-frame 3D images of objects in a scene 108 at a CCD camera's frame rate (e.g., 30 fps or faster). More particularly, the system 100 uses a novel spatial varying intensity projection (SVIP) scheme to unambiguously determine the projection angles of laser beams on all the pixels in an image, thus enabling the system 100 to produce full-frame 3D images in real time at a video rate. A single-frequency laser, such as from the laser source 102, is used as an active illumination source. As a result, the signal-to-noise ratio of the measurable return signal is higher, particularly if a narrow-band filter 214 is used to eliminate background signals, than systems using wide-spectrum light projection.

Referring to FIGS. 5A through 5D, the inventive 3D imaging system 100 operates generally on the principle of triangulation by illuminating an object or scene with spatial-temporally varying patterns and examining the way the pattern structure is changed by the object provides information on the three-dimensional shape of this object.

Figure 4:
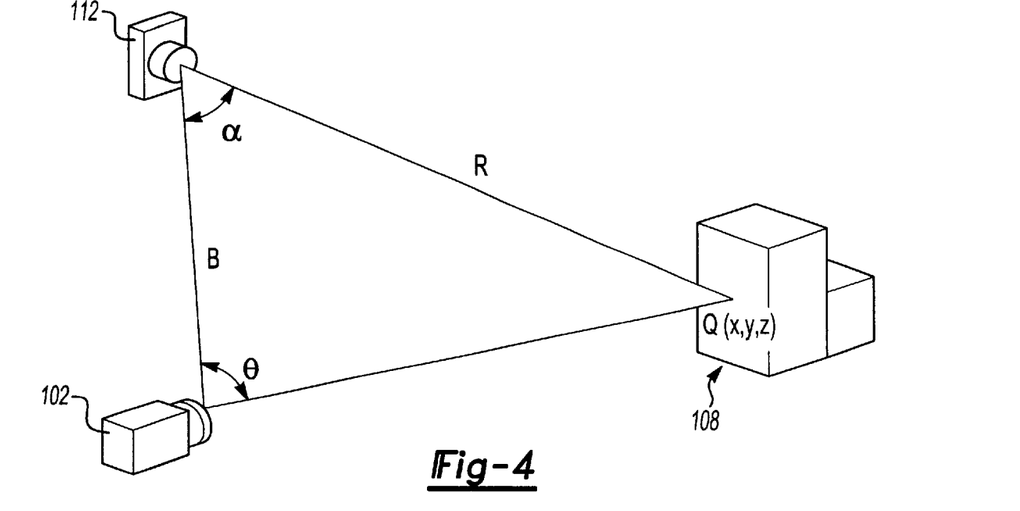
FIG. 4 is a representative diagram illustrating a triangulation principle used by one embodiment of the inventive system.

As shown in FIG. 4, the system is based on the relationship between the light source 102, the camera 112, and the object or scene being imaged 108. A triangle is uniquely defined by the angles theta ($\theta$) and alpha ($\alpha$), and the length of the baseline (B). With known values for $\theta$, $\alpha$, and B, the distance (i.e., the range R) between the camera 112 and a point Q on the object's surface can be easily calculated using the following formula:

$$R = B \frac{\sin(\theta)}{\sin(\alpha + \theta)} \quad (1)$$

Because the baseline B is predetermined by the relative positions of the light source 102 and the camera 112, and the value of $\alpha$ can be calculated from the camera's geometry, the key to the triangulation method is to determine the projection angle, $\theta$, from an image captured by the camera 112 and more particularly to determine all $\theta$ angles corresponding to all the visible points on an object's surface in order to obtain a full-frame 3D image in one snapshot.

Referring now to FIGS. 5A through 5D, the inventive system 100 uses a temporal-spatial modulation scheme to project onto the object or scene 108 a structured light pattern 110 whose illumination intensity gradually varies from left to right or from top to bottom. For purposes of explanation only, the description will focus on a case where the intensity varies horizontally, from left to right. More particularly, the light pattern 100 will become either darker or lighter as it progresses horizontally. The unique geometric configuration between the light source 102, the camera 112 and the object or objects in the scene being imaged 108 create a fixed one-to-one relationship between the projection angle $\theta$ of a light sheet and the projected intensity I, which can be stored in a look-up table in the camera 112 or in the host computer 116. That is, if $\theta1 > \theta2 > \theta3$, then $I1 < I2 < I3$, and vice versa. More particularly, the linear relationship between the projected light intensity and the projection angle can be expressed as:

$$I = I_0 + k\theta \quad (2)$$

where k is a proportional coefficient.

If all of the objects in a given scene all have a uniform color, then it would be theoretically possible to determine the projection angles corresponding to all of the surface points of the objects by measuring the illumination intensities of each surface point. This type of intensity information is readily available from a gray-scale image captured by a CCD camera and, with known baseline and camera geometric parameters, it is theoretically possible to solve the triangulation problem and obtain real-time full frame 3D images of the scene. In reality, however, most objects and scenes have complex surface color patterns, and the surface color variations will adversely interfere with the projected light illumination. As a result, the pixel intensities of a CCD camera will be affected by both the projected light intensity and also by the surface color, invalidating the one-to-one relationship between pixel intensity and projection angle.

To reduce the influence of the surface color on pixel intensity, the inventive system obtains an image pair using two different projection patterns. A pixel intensity ratio is then determined for the image.pair to remove the influence of the object's surface color. As a result, the pixel intensity ratio allows the system to uniquely determine the projection angle associated with each pixel in the captured image, even if the object or scene being imaged has complex surface color patterns. More particularly, even though the intensity value of pixels in each image can be affected by the surface color of objects in the scene, the pixel intensity ratio of the image pair is independent of the surface color and purely determined by the projection angle of image patterns. In fact, since each pixel on an image corresponds to a surface point on the object, the pixel intensity in an image taken by a monochromic CCD camera 112 can be expressed as:

$$i = r^* P \quad (3)$$

where i represents the intensity value of a pixel (corresponding to a given surface point the object in the scene), r represents the reflectance coefficient at the given surface point of the object, and P denotes the projected light intensity by the light projector at the given surface point. Examining the same pixel in the image pair when taken under the two exposures of even and odd illumination patterns, respectively, yields intensity values $i_1 = r^* P_1$, and $i_2 = r^* P_2$. The pixel intensity ratio R therefore becomes:

$$R = \frac{i_1}{i_2} = \frac{r * P_1}{r * P_{21}} = \frac{P_1}{P_2} \quad (4)$$

As shown in Equation 4, the pixel intensity ratio R is independent of the surface reflectance r of the given surface point. Instead, the projected light intensities $P_1$ and $P_2$ of the laser light source 102 onto the given point are determined solely by the double flash light projection patterns. Using this normalization procedure, we can uniquely represent the light projection angle, θ based on the ratio of the pixel intensity in a given image pair. In other word, we can establish a one-to-one correspondence between R and θ and thus obtain a full frame 3D image using paired images.

FIGS. 5A through 5D illustrate the manner in which image pairs are obtained in more detail. In a standard CCD camera, acquisition of a full-frame image involves two separate "field image" acquisitions For example, if the frame rate is 1/30 second, the two separate field image acquisitions will each have a duration of 1/60 of a second. In the first 1/60 second interval, an image containing the even lines of pixels (the "even field") is taken, and in the second 1/60 second interval, an image with odd lines of pixels (the "odd field") is taken. As can be seen in the timing diagram of FIG. 5A, the even and odd fields are alternately acquired with respect to each other. The even and odd fields are then put together to form a full-frame image.

Figure 5A:
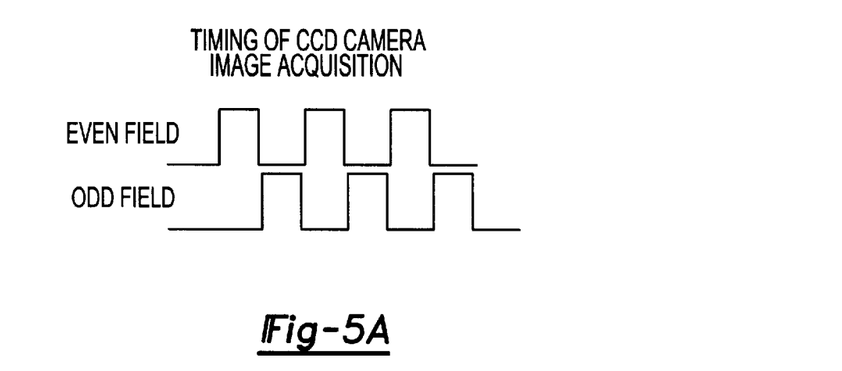
FIGS. 5A through 5D are diagrams that illustrate the relationship between image acquisition and pattern projection in one embodiment of the inventive system.
Figure 5B:
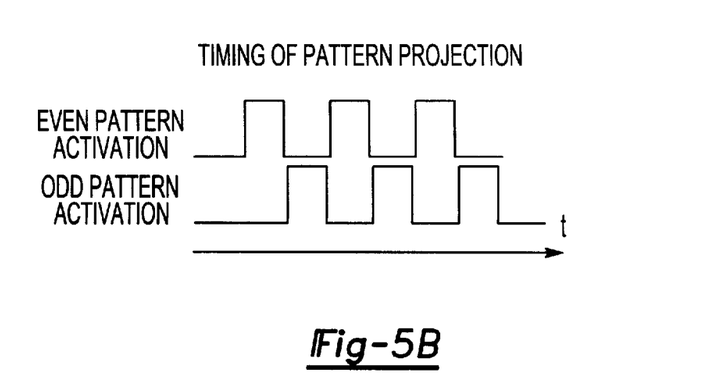
Figure 5C:
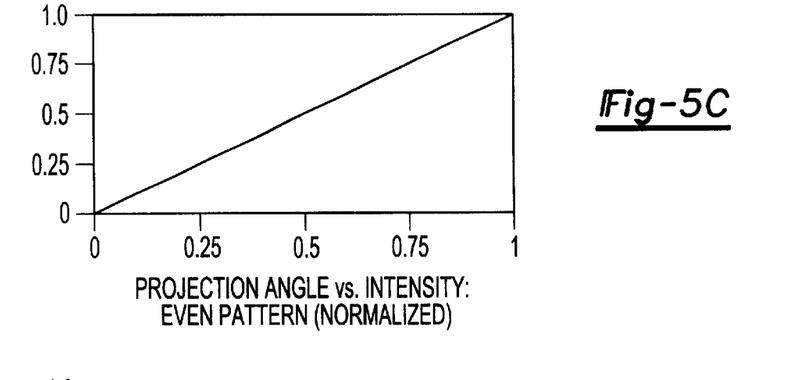
Figure 5D:
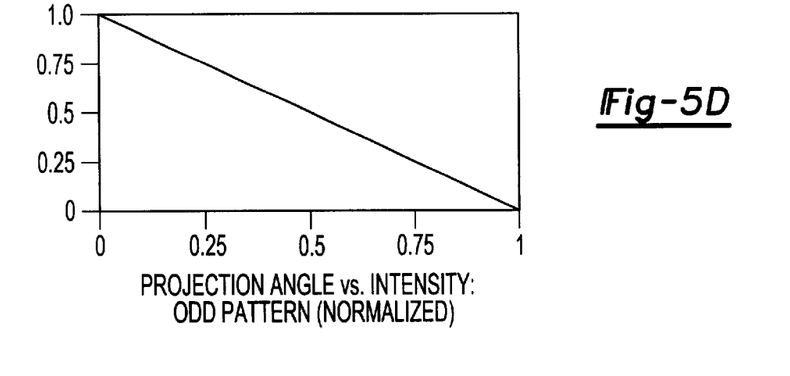

Referring to FIG. 5B, two flashes of light with opposite intensity varying patterns, called the "even" pattern and the "odd" pattern, respectively. The projection of the even and odd patterns is synchronized with the timing of the CCD camera's frame acquisition, such that the even field of image captures the image from the even pattern projection, and the odd field of image captured the image from the odd pattern projection. As can be seen in FIGS. 5C and 5D, the intensity increases as the projection angle increases in the even field, and the intensity decreases as the projection angle increases in the odd field. The paired field images under two illumination patterns are taken as the even and odd fields in a single frame of the image.

The image pairs, when evaluated together, provide all the necessary information needed for determining the projection angle corresponding to all pixels in a full-frame 2D image, from which a full-frame 3D image can be calculated. Of cause, corresponding pixel positions in the even and odd field images have a one pixel offset, which can either be ignored or be compensated using a pixel interpolation scheme. The even and odd fields are then compared to obtain the ratio R from which projection angle and the range can be determined.

If higher resolutions are required, the camera can obtain odd and even field images using the same light intensity varying illumination pattern and in addition obtain both odd and even field images using the opposite light intensity varying illumination pattern as noted above. When a ratio is taken between these two complete images, no pixel offset is at issue and higher resolution 3D images result. However, this method may decrease the frame rate, due to the additional image capturing operations, unless a faster camera is used (e.g., one that can provide both full video speed at 30 frames per second while taking two images of for each frame corresponding to odd and even field images that are compared with no pixel offset.

The spatially varying intensity projection concept will now be explained in more detail with respect to FIGS. 5A through 5D. The spatially varying intensity projection is preferably conducted using a single laser source 102. As illustrated in FIG. 1, the light from the laser light source is steered by the scanner over the entire scene in the camera's 112 field of view to generate an active light pattern projection.

To gradually vary the intensity of the illumination pattern with respect to the projection angle, the laser amplitude modulator 103 modulates the magnitude of the laser source in synchronization with the changing angular position of the scanning mirror in the scanner 109. For example, to produce an "even pattern", the laser intensity is controlled to be low at the smaller scanning angle and gradually increasing linearly as the scanning angle increases. This intensity-varying scanning process effectively produces a spatially varying intensity projection over the entire scene 108. The entire scanning process is completed within a single cycle of the CCD camera's field image acquisition, which is 1/60 second in this example. The odd pattern is implemented in a similar fashion, but with the relationship between the intensity and the scanning angle reversed. As noted above, the image acquisition of the even field and odd field of a given frame is synchronized with the projection of the even and odd patterns, respectively. As a result, the even and odd fields together form a complete frame of the image and has all of the information needed to calculate the projection angle corresponding to each pixel via triangulation and the pixel intensity ratio as explained above.

The inventive system therefore simplifies the 3D calculation for each pixel to three steps: (1) finding the intensity ratio from even and odd field images (or first and second full frame images); (2) accessing a look-up table to obtain the projection angle corresponding to the intensity ratio; and (3) calculating distance using triangulation calculation to get (x, y, z) coordinates. The 3D calculations for all pixels are exactly the same. There is no feature extraction, no correspondence finding, or any other types of complex operations needed in the 3D imaging algorithm of the present invention. Further, because the projected illumination patterns are continuous spatial functions, the spatial resolution of the present invention is theoretically infinite and is limited, as a practical matter, only by the resolution of the CCD camera used in the system.

Although the above examples focus on using a laser source 102 that transmits visible light, the spectrum of the laser source can be selected in the infrared (IR) or ultraviolet (UV) regions as well without any other modifications in the system 100. This flexibility facilitates some special applications where visible light illumination is undesirable.

Further, the inventive system 100 can be used in conjunction with other functions, such as 2D texture overlays on the 3D image and ambient light compensation methods (e.g., subtracting a reference image captured under ambient light from the image captured under active light).

Figure 6:
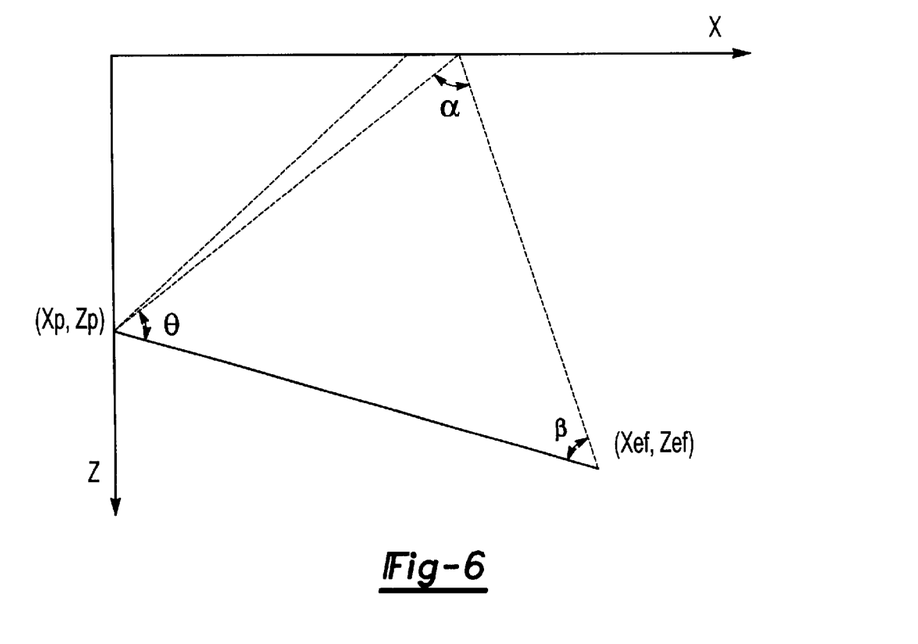
FIG. 6 illustrates an error sensitivity analysis that is conducted during calibration of the inventive system.

Referring now to FIG. 6, the inventive system 100 should be calibrated before any measurements are actually conducted. The parameters to be calibrated include the camera 112 position and orientation; the laser projector 112 position, the relationship between the scanning angle of the scanner 109 and a scanner control voltage, the relationship between laser intensity and modulation voltage, the camera focal length, and the baseline B length.

As explained above, the triangulation algorithm used in the inventive system is based on the following formula:

$$R = \frac{\sin\theta}{\sin\alpha} b \quad (5)$$

where $\alpha = \pi - \theta - \beta$. All of variables, θ, α, and β in Equation (5) may introduce error in the range calculation. In the error sensitivity analysis, it is assumed that the coordinate of the camera's focal point in the world coordinate system can be obtained precisely through camera calibration. To conduct the error sensitivity analysis, the first full derivative of the range R is taken as follows:

$$dR = \left[\frac{\sin\theta\cos a}{-\sin^2 a}b\right]da + \left[\frac{\cos\theta}{\sin a}\right]db \qquad (6)$$

The dα, dθ, and db are all functions of the position error of the light projector ($dx_p$, $dz_p$) and the intensity ratio mismatch dx. Notice that:

$$b = \sqrt{(x_{cf} - x_s)^2 + (z_{cf} - z_s)^2} \qquad (7)$$

$$\beta = -\tan^{-1}\frac{z_{cf} - z_p}{x_{cf} - x_p} + \tan^{-1}\frac{z_{cf}}{x_{cf} - x} \qquad (8)$$

$$\theta = \tan^{-1}\frac{z_{cf} - z_p}{x_{cf} - x_p} + \tan^{-1}\frac{z_p}{x - x_p} \text{ therefore,} \qquad (9)$$

$$db = \frac{(x_p - x_{cf})dx_p + (z_p - z_{cf})dz_p}{b} \qquad (10)$$

$$d\beta = \frac{(x_{cf} - x_p)dz_p + (z_p - z_{cf})dx_p}{b^2} \qquad (11)$$

$$d\theta = \frac{(x_p - x_{cf})dz_p + (z_{cf} - z_p)dx_p}{b^2} - \frac{z_p}{(x - x_p)^2 + z_p^2}dx \qquad (12)$$

The host computer may compensate for these error values, if desired.

Camera noise may also introduce error into the signal. For example, if it is assumed that the even and odd field signals (denoted as p(t) and q(t), respectively) always contain random noise, the noise can be expressed as:

$$p = P_0 + n_p(t) \qquad (13)$$

$$q = q_0 + n_q(t) \qquad (14)$$

where 0<p,q<1, and $n_p(t)$, $n_q(t)$ are the uniformly distributed zero-mean noise within the region of [−L, L], wherein L is a positive number whose value can be calculated from the signal-to-noise ratio of the camera 112.

According to Equation (6), then, the range error due to camera's noise can be expressed as:

$$dr = \frac{\cos\theta}{-\sin a}b\left[-\frac{z_s dx}{(x - x_s)^2 + z_s^2}\right]$$

Thus, the inventive system and method can obtain the (x, y, z) coordinates of more than 300,000 surface points of objects in a 3D scene with a single "snap-shot", assuming 640×480 pixels in a typical image. Therefore, the system 100 greatly simplifies object detection, recognition, classification, target tracking, sensor data fusion and feature overlay. The system can be integrated using off-the-shelf products, leading to low production cost, short development period, and high reliability.

While the invention has been specifically described in connection with certain specific embodiments thereof, it is to be understood that this is by way of illustration and not of limitation, and the scope of the appended claims should be construed as broadly as the prior art will permit.

What is claimed is:

1. A system for generating three-dimensional (3D) images of a scene, comprising:
   a light source for projecting a first light pattern and then a second light pattern onto the scene, wherein each of said light patterns vary in intensity across the scene;
   a camera for capturing an image of the scene illuminated by said light source, said image being composed of lines of pixels, wherein said camera captures a first field of said image including even-numbered lines of pixels while the scene is illuminated by said first light pattern and captures a second field of said image including odd-numbered lines of pixels while the scene is illuminated by said second light pattern; and
   a processor for interlacing said first and second fields to form said image and for calculating a distance to points on the scene corresponding to pixels in said image, said processor calculating the distance based on projection angles of light from said light source as determined by matching intensities with the projection angles.

2. The system of claim 1, wherein said light source includes:
   a variable intensity laser; and
   a cylindrical lens for creating a plane of light from light emitted by said laser.

3. The system of claim 1, further comprising a scanner for scanning said plane of light across the scene, wherein an intensity of said laser is varied as said scanner scans said plane of light across said scene.

4. The system of claim 3, wherein said scanner is one selected from the group consisting of a polygon scanner, a galvanometric scanner, and a holographic scanner.

5. The system of claim 2, further comprising a filter disposed between said camera and the scene being imaged, wherein said filter allows light emitted from said laser to reach the scene.

6. The system of claim 1, wherein the camera captures an image pair, wherein the processor calculates a pixel intensity ratio of the image pair such that the pixel intensity ratio corresponds with a unique projection angle.

7. The system of claim 6, wherein the first and second images are captured at alternating times.

8. The system of claim 1, wherein the intensity increases as the projection angle increases in the first pattern and the intensity decreases as the projection angle increases in the second pattern.

9. A system for generating three-dimensional (3D) images of a scene, comprising:
   a light source comprising a variable intensity laser that emits a laser beam;
   a lens that creates a light plane from the laser beam to generate a variable intensity light pattern;
   a scanner for scanning said light plane across the scene to illuminate the scene with a light pattern of variable intensity;
   a camera for capturing the scene illuminated by said light source; and
   a processor for calculating a distance to points on the scene corresponding to pixels in an, image from said camera, said processor calculating the distance based on projection angles of light from said light source as determined by matching intensities with the projection angles.

10. The system of claim 9, wherein said scanner is one selected from the group consisting of a polygon scanner, a galvanometric scanner, and a holographic scanner.

11. The system of claim 9, further comprising a filter disposed between said camera and the scene being imaged, wherein said filter allows light emitted from said laser to reach the scene.

12. The system of claim 9, wherein the camera captures an image pair, wherein the processor calculates a pixel intensity ratio of the image pair such that the pixel intensity ratio corresponds with a unique projection angle.

13. The system of claim 12, wherein the first and second images are captured at alternating times.

14. The system of claim 12, wherein the image pair includes a first field captured when the light source projects a first pattern and a second field captured when the light source projects a second pattern.

15. The system of claim 14, wherein the intensity increases as the projection angle increases in the first pattern and the intensity decreases as the projection angle increases in the second pattern.

16. A system for generating three-dimensional (3D) images of a scene, comprising:
    a light source comprising a variable intensity laser that emits a laser beam;
    a lens that creates a light plane from the laser beam to generate a first and a second variable intensity light pattern, wherein the intensity increases as a projection angle increases in the first light pattern and wherein the intensity decreases as the projection angle increases in the second light pattern;
    a scanner for scanning said light plane across the scene to illuminate the scene sequentially with said first light pattern and then said second light pattern;
    a camera for capturing a first image when the scene is illuminated by the first pattern and a second image when the scene is illuminated by a second pattern;
    a synchronizer for synchronizing the laser, the scanner, and the camera; and
    a processor for calculating a distance to points on the scene corresponding to pixels in an image from said camera based on pixel intensity ratios calculated from the first and second images, wherein a pixel intensity ratio for a given pixel corresponds with a unique projection angle.

17. A method of generating a three-dimensional (3D) image of a scene, the method comprising the steps of:
    projecting a first light pattern with a spatially varying intensity from a light source onto the scene;
    capturing a first field of an image including even numbered lines of pixels of said image while said scene is illuminated by said first light pattern;
    projecting a second light pattern with a spatially varying intensity from the light source onto the scene;
    capturing a second field of said image including odd numbered lines of pixels of said image while said scene is illuminated by said second light pattern; and
    calculating a distance to points in the scene based on projection angles of light from the light source by matching intensities with the projection angles.

18. The method of claim 17, wherein the calculating a distance step further comprises compensating for a pixel offset when matching pixel intensities between said first and second fields.

19. The method of claim 17, wherein the calculating a distance step comprises the steps of:
    determining an intensity ratio for each pixel using said first field and said second field of said image; and
    determining a projection angle for each pixel by correlating the intensity ratio for that pixel with a unique projection angle.

20. A method of generating a three-dimensional (3D) image of an object, the method comprising the steps of:
    projecting a single light pattern with a spatially varying intensity from a light source onto the object;
    capturing an image of said object while said object is illuminated by said light pattern;
    calculating a distance to points in on the object using only said image of said object illuminated by said single light pattern and a lookup table correlating light intensity and projection angle.

* * * * *

UNITED STATES PATENT AND TRADEMARK OFFICE
CERTIFICATE OF CORRECTION

PATENT NO.    : 6,600,168 B1
DATED         : July 29, 2003
INVENTOR(S)   : Geng, Zheng Jason

It is certified that error appears in the above-identified patent and that said Letters Patent is hereby corrected as shown below:

Column 1,
Line 9, add the following:

-- STATEMENT REGARDING FEDERALLY SPONSORED RESEARCH OR DEVELOPMENT
    This invention was made with Government support under contract DASG60-98-C-0072 awarded by U.S. Army Space and Missile Defense Command. The Government has certain rights in the invention. The U.S. Government has a paid-up license in this invention and the right in limited circumstances to require the patent owner to license others on reasonable terms as provided for by the terms of the above-identified contract. --

Signed and Sealed this

Twelfth Day of October, 2004

JON W. DUDAS
*Director of the United States Patent and Trademark Office*